United States Patent [19]
Sasaki

[11] Patent Number: 5,697,569
[45] Date of Patent: Dec. 16, 1997

[54] TAPE CASSETTE

[75] Inventor: Jun Sasaki, Miyagi, Japan

[73] Assignee: Sony Corporation, Tokyo, Japan

[21] Appl. No.: 671,729

[22] Filed: Jun. 28, 1996

[30] Foreign Application Priority Data

Jul. 26, 1995 [JP] Japan .......................... P07-189968

[51] Int. Cl.$^6$ .................. G11B 23/087; G11B 23/04; G11B 23/02
[52] U.S. Cl. ................... 242/345; 242/347; 242/348
[58] Field of Search .......................... 242/345, 347, 242/348; 360/132

[56] References Cited

U.S. PATENT DOCUMENTS

| 4,526,330 | 7/1985 | Shimizu | 242/345 |
| 4,560,117 | 12/1985 | Shimizu | 242/345 |
| 5,418,671 | 5/1995 | Schoettle et al. | 360/132 |

*Primary Examiner*—John Q. Nguyen
*Attorney, Agent, or Firm*—Jay H. Maioli

[57] ABSTRACT

In order to prevent interference between the upper flange of a tape reel and the upper edge of a magnetic tape when a tape cassette is ejected from a cassette drive system, the tape cassette case is formed with a raised portion. In the illustrated examples, the cassette case consists of upper and lower half case members, and a pair of tape reels rotatably supported in the case. When loaded in the drive system, reel holders enter first and second holder holes of the cassette case and uphold the tape reels above the inside surface of the cassette case, respectively. Each holder hole is fringed by an inner raised portion raised from the inside surface of the cassette case, and an outer raised portion which is outside the inner raised portion and lower in height than the inner raised portion.

8 Claims, 7 Drawing Sheets

TAPE CASSETTE

BACKGROUND OF THE INVENTION

The present invention relates to a tape cassette having at least one hole through which a reel holder is inserted when the cassette is loaded in a drive system (a record reproducing system, that is), and a tape reel in the cassette is raised and supported by the reel holder of the drive system.

Figure 10:
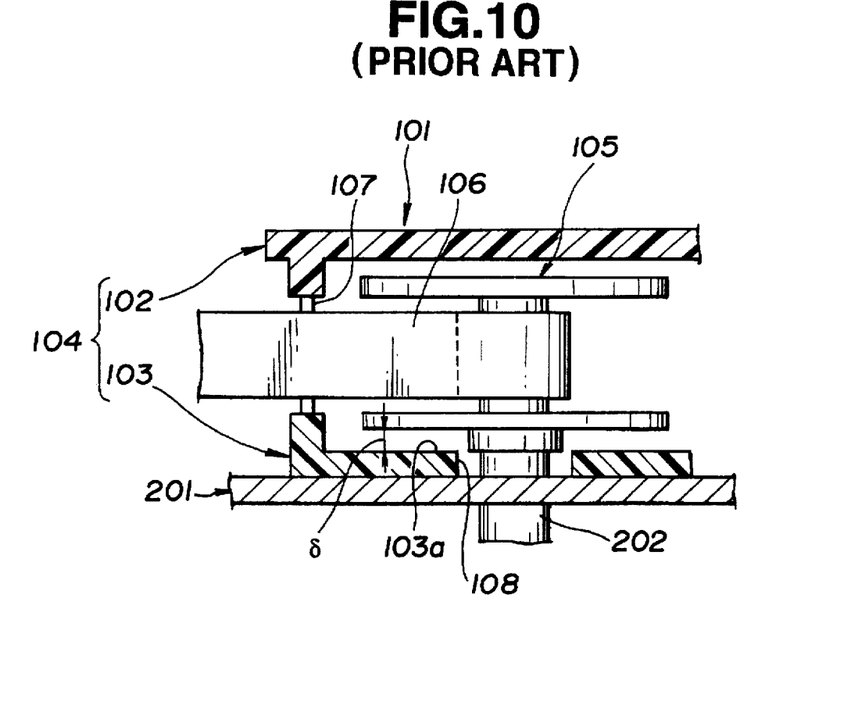
FIG. 10 is a sectional view showing a part of a first conventional tape cassette in the loaded state.
Figure 11:
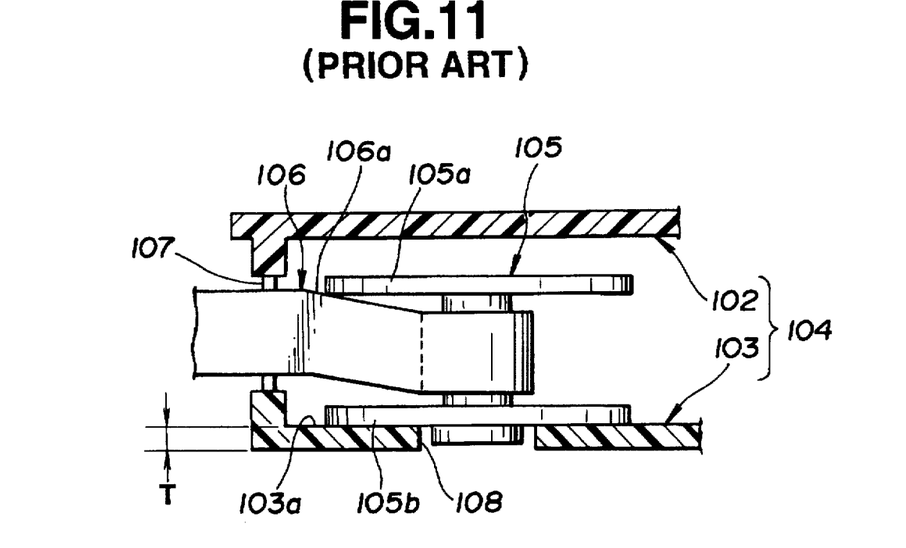
FIG. 11 is a sectional view showing the first conventional tape cassette in the ejected state.
Figure 12:
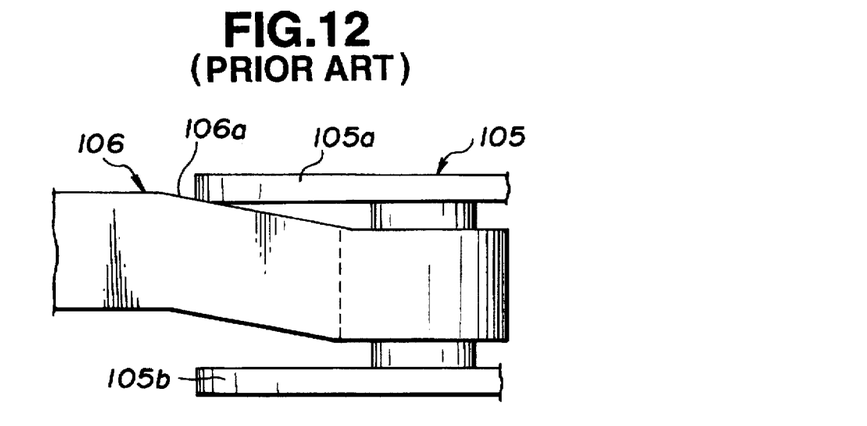
FIG. 12 is a side view illustrating an interference between a magnetic tape and a tape reel in the first conventional tape cassette.

FIGS. 10~12 show, as an example, a conventional tape cassette for a video cassette recorder (VCR). FIG. 10 shows a tape cassette 101 in section. The tape cassette 101 has a cassette case 104 constituted by upper and lower half case members 102 and 103, encasing rotatable tape reels 105. FIG. 10 shows only one of the reels. A magnetic tape 106 is wound on the tape reel 105 as shown in FIG. 10, and extracted through a tape guide 107. The lower half member 103 of FIG. 10 is formed with a reel holder hole 108.

When this tape cassette 101 is loaded into a drive system 201 (such as a VCR), a reel holder 202 of the drive system juts through the holder hole 108 into the tape cassette 101, and supports the tape reel 105 a predetermined spacing δ afloat above the inside surface 103a of the lower half member 103, as shown in FIG. 10. The magnetic tape 106 is drawn out of the tape cassette 101, passed around a video recording and reproducing section of the drive system, and thus loaded in the drive system.

Then, the tape reel 105 is rotated by the tape holder 202, and the drive system 201 performs the recording or reproducing operation on the tape 106 running through the recording and reproducing section.

When, however, the thus-constructed tape cassette 101 is ejected from the drive system, the outer periphery of the upper reel flange 105a, as shown in FIGS. 11 and 12, tends to press the upper edge 106a of the magnetic tape 106, and to degrade the picture quality by bending the upper tape edge 106a.

In the eject operation of the tape cassette, the reel holder 202 shown in FIG. 10 descends and accordingly the tape reel 105 supported on the reel holder 202 descends together with the reel holder 202 until the lower reel flange 105b abuts on the upwardly facing inside surface 103a of the lower half member 103 as shown in FIG. 11. In this case, the downward displacement of the tape reel 105 is equal to the spacing δ shown in FIG. 10. Despite this downward movement of the tape reel 105, the friction between the tape guide 107 and the magnetic tape 106 prevents the magnetic tape 106 from moving downwards. Therefore, the upper flange 105a of the descending tape reel 105 tends to touch the magnetic tape 106 near the tape guide 107 as shown in FIGS. 11 and 12.

Figure 13:
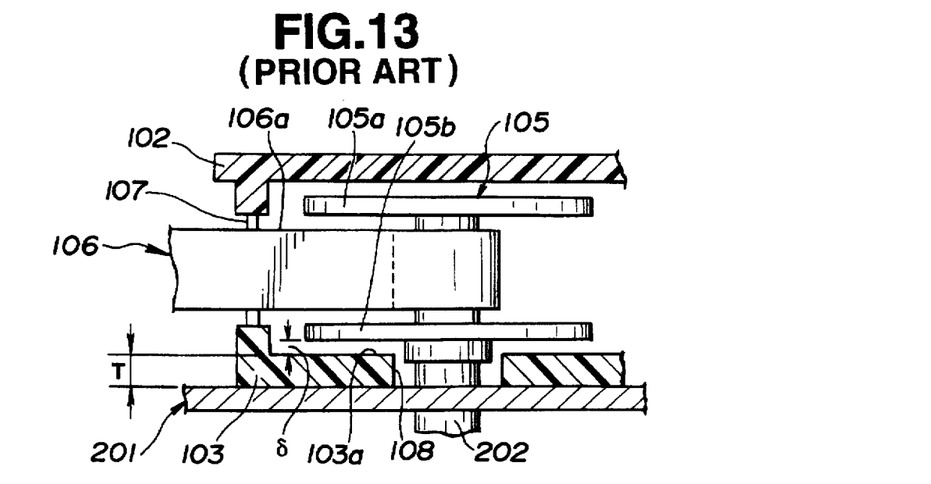
FIG. 13 is a sectional view showing a second conventional tape cassette in the loaded state.
Figure 14:
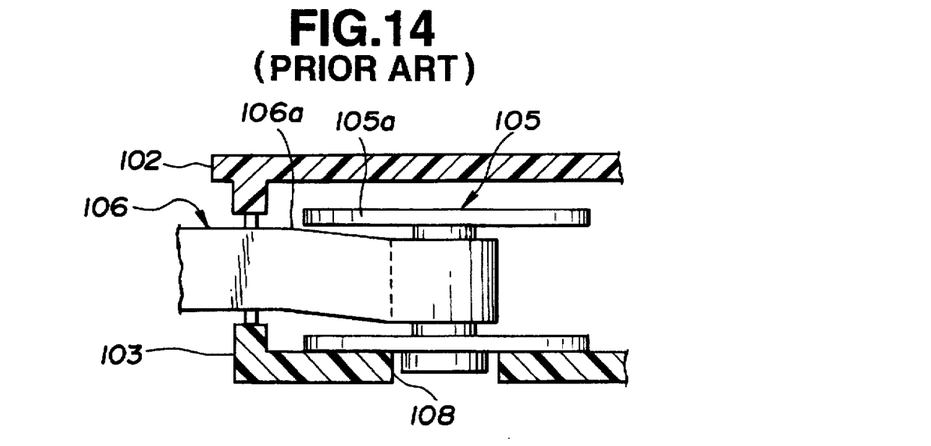
FIG. 14 is a sectional view of the second conventional tape cassette in the ejected state.

FIGS. 13 and 14 show a second conventional tape cassette arranged to avoid the interference between the upper reel flange and the tape. In this tape cassette, as shown in FIG. 13, the wall thickness T of the lower half member 103 is increased, and thereby the spacing δ is decreased to limit the downward movement of the tape reel 105 during the eject operation to such an extent as to prevent contact between the upper reel flange and the tape.

The thick wall, however, of the lower half member 103 increases the cost of the raw material and the weight of the lower half member 103. Furthermore, if the rotating tape reel 105 vibrates out of a reference rotating surface, the outer periphery of the lower reel flange 105b readily rubs against the inside surface 103a of the lower half member 103 because of the narrow spacing δ, and the tape reel 105 may become unable to rotate.

SUMMARY OF THE INVENTION

It is therefore an objective of the present invention to provide a tape cassette that is effective in preventing the contact between an upper reel flange and a magnetic tape and the contact between a lower reel flange and an inside surface of a case.

According to the present invention, a tape cassette comprises: a tape carrying means including at least one tape reel; and a cassette case enclosing the tape carrying means. The cassette case comprises an upper case member and a lower case member. The lower case member comprises a lower wall formed with at least one reel holder hole for receiving a reel holder of a cassette drive system to uphold the tape reel in the cassette case when the tape cassette is inserted in the cassette drive system. In this tape cassette, the lower case member comprises a surrounding zone which surrounds the holder hole and which comprises an inner raised portion raised from an inside wall surface of the lower wall, and an outer raised portion raised from the inside wall surface of said lower wall. The inner raised portion, is closer to the holder hole than the outer raised portion, and the height of the inner raised portion from the inside wall surface of the lower wall is greater than the height of the outer raised portion.

In the loaded state in which the tape reel is upheld by the reel holder, the spacing between the tape reel and the inside surface of the lower case member is decreased by the taller inner raised portion to prevent the upper edge of the magnetic tape from being pressed by the tape reel in the eject operation. The shorter outer raised portion relatively increases the spacing between the tape reel and the inside surface of the lower case member to prevent the tape reel from touching the inside surface of the lower case member.

DETAILED DESCRIPTION OF THE INVENTION

FIGS. 1 through 5 show a tape cassette according to a first embodiment of the present invention.

Figure 1:
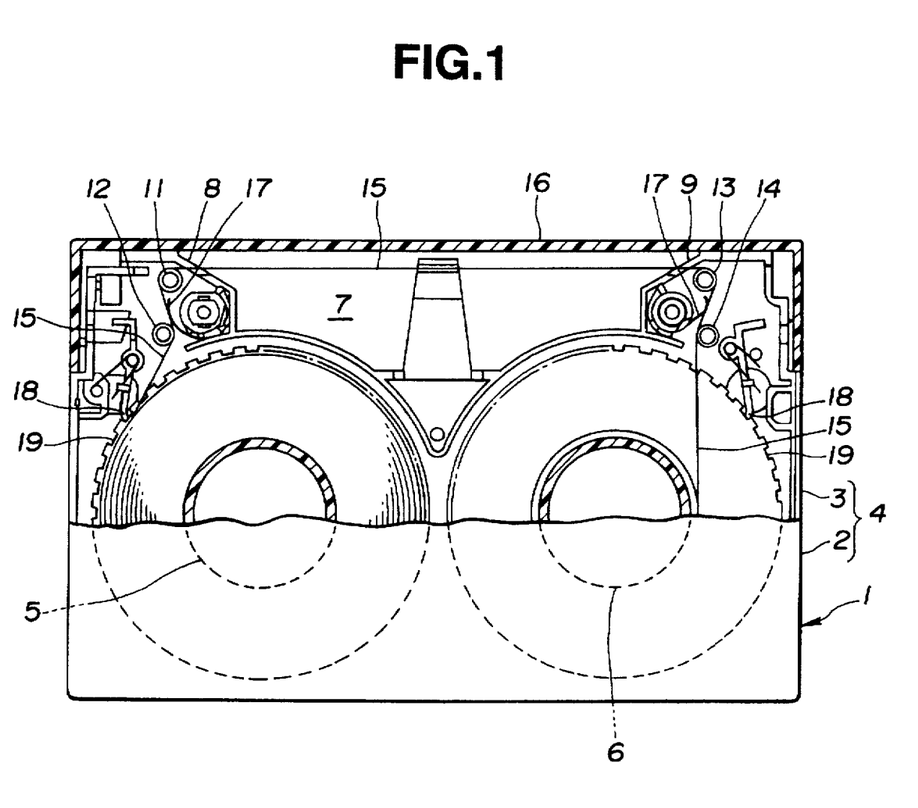
FIG. 1 is a cutaway plan view showing a tape cassette according to a first, second or third embodiment of the present invention.

FIG. 1 is a cutaway plan view showing the tape cassette 1. The tape cassette 1 shown in FIG. 1 includes a cassette case (or tape reel casing) 4 composed of an upper half case member 2 and a lower half case member 3, and first and second tape reels (or spools) 5 and 6 rotatably supported in the cassette case 4.

In the front side of the cassette case 4, there is formed a front hollow portion 7 for tape extraction. When the cassette 1 is inserted in a drive system, the front side of the cassette 1 faces toward a head drum of the drive system. The front hollow portion 7 is bounded on one lateral side (that is, the left side as viewed in FIG. 1) by a first partition wall defining a first tape passage hole 8, and on the other lateral side by a second partition wall defining a second tape passage hole 9. Behind the first partition wall, a first tape guide 11 faces close to the first tape passage hole 8, and a first rear tape guide 12 stands on the rear side of the front tape guide 11. Similarly, a second front tape guide 13 and a second rear tape guide 14 are arranged behind the second partition wall.

A magnetic tape 15 wound around the first reel 5 is guided by the rear tape guides 12 and the front tape guide 11 on the first lateral side, and stretched through the first tape passage hole 8 into the front hollow portion 7. From the front hollow portion 7, the tape 15 further extends through the second tape passage hole 9 into the inside of the cassette case 4, and then the tape 15 is led by the front and rear tape guides 13 and 14, and taken up by the second reel 6.

A front lid 16 is rotatably mounted on the front part of the cassette case 4 to open and close the front hollow portion 7. When the cassette 1 is not in use, the front lid 16 is held in a closed position to close the front hollow portion 7 by a spring for urging the lid 13 in the closing direction. When the cassette 1 is inserted into the drive system, a lid opener of the drive system pushes the front lid 13 against the resilient force of the spring, and brings the front lid 13 to an open position to open the front hollow portion 7.

Tape tension adjusters 17 for preventing the tape 15 from slackening are provided, respectively, near the rear tape guides 12 and 14. Each tension adjuster 17 takes up the slack of the tape 15 by pushing the tape 15 toward the rear tape guide 12 or 14.

The tape cassette 1 further includes reel lock members 18 for holding the reels 5 and 6 immovable. The lock members 18 are located near the rear tape guides 12 and 14, respectively. The periphery of a lower flange of each of the first and second reels 5 and 6 is formed with teeth 19 like a gear. Each of the tape lock members 18 locks the corresponding reel 5 or 6 by engaging with the toothed portion 19 of the reel 5 or 6.

Figure 2:
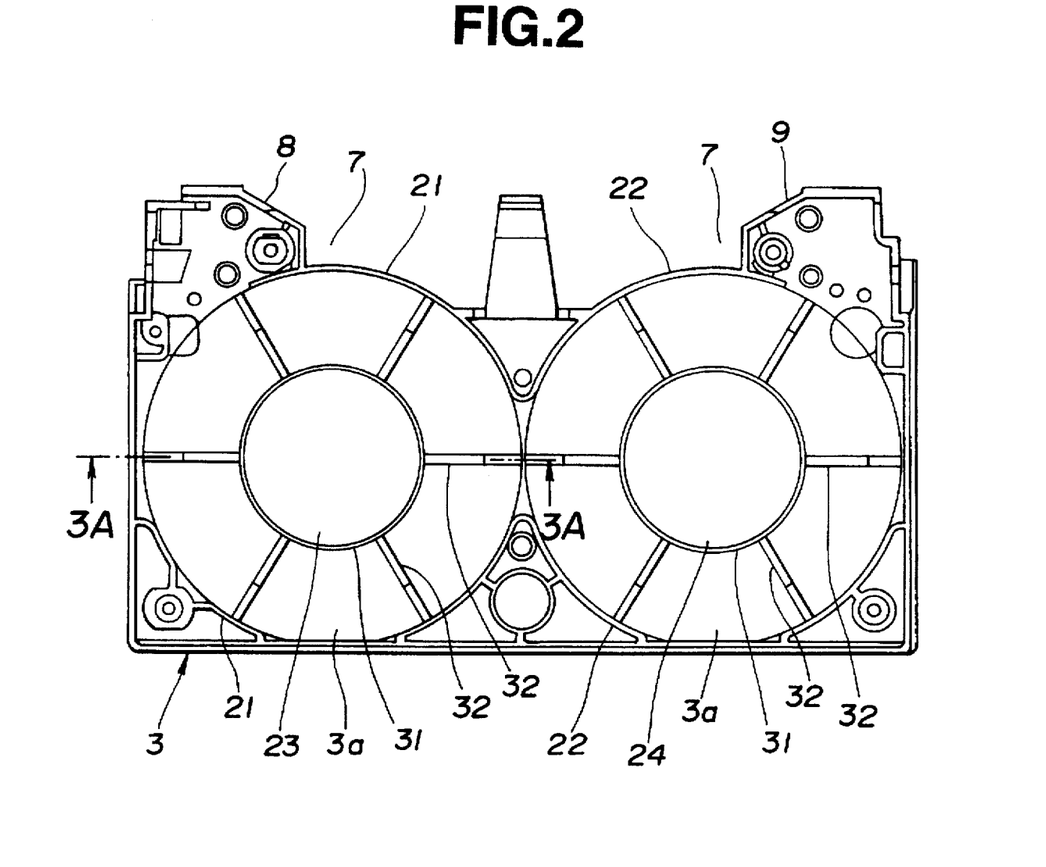
FIG. 2 is a plan view of a lower half case member 3 of the cassette according to the first embodiment of the present invention.
Figure 3:
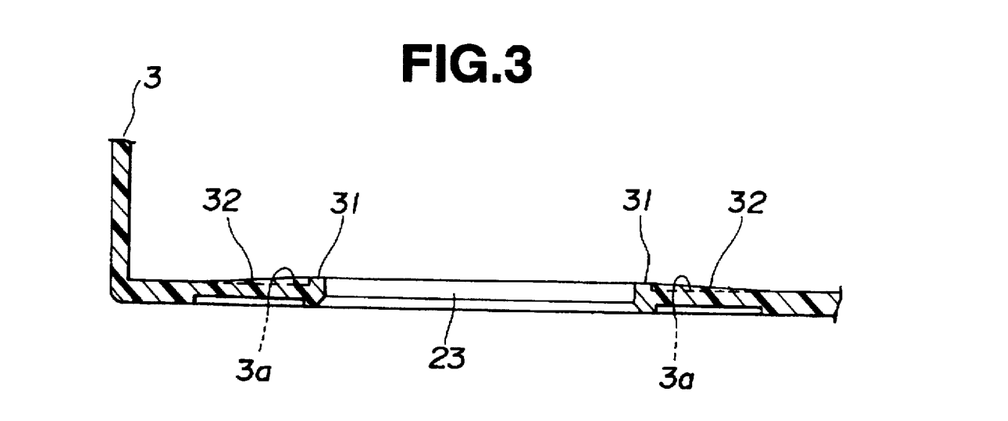
FIG. 3 is a sectional view taken across a line 3A—3A of FIG. 2.

FIG. 2 shows the lower half case member 3 according to the first embodiment of the present invention. The lower half case member 3 has first and second annular ribs 21 and 22 for defining circular chambers receiving the first and second reels 5 and 6, respectively. The lower half case member 3 further has first and second holder holes 23 and 24 formed in the centers of the first and second annular ribs 21 and 22, respectively. In this example, the holder holes 23 and 24 are circular and concentric with the annular ribs 21 and 22, respectively.

The lower half case member 3 shown in FIG. 2 further has first and second annular inner projections (or inner raised portion) 31 fringing the first and second holder hole 23 and 24, respectively, and first and second groups of outer projections (outer raised portions) 32 surrounding the first and second inner projections 31, respectively. In this example, the outer projections 32 extend radially from the corresponding annular inner projection 31 toward the annular rib 21 or 22 on each of the first and second lateral sides (the left and right sides as viewed in FIG. 2). In this example, there are six of the outer projections (radial ridges) 32 on each lateral side. On each lateral side, each of the six outer projections 32 extends radially from the inner projection 31 so as to describe radii emanating from the center of the holder hole 23 or 24.

Each of the radial outer projections 32 extends radially from a radial inner end adjoining the corresponding annular inner projection 31 to a radial outer end. Each radial outer projection 32 has a sloping top surface, and the height of each radial outer projection 32 decreases gradually from the radial inner end toward the radial outer end. That is, the height of each radial outer projection 32 becomes smaller as the distance from the corresponding inner projection 31 increases. The height of each radial outer projection 32 becomes equal to zero near the corresponding annular rib 21 or 22.

The radial outer projections 32 are formed in a zone surrounding the corresponding holder hole 23 or 24. The surrounding zone is bounded by a circular outer boundary, and the height of the sloping surface of each outer projection 32 becomes equal to zero at the outer boundary of the surrounding zone. The diameter of the circular flanges 5a and 5b or 6a and 6b of each reel 5 or 6 (shown in FIG. 4) is greater than the diameter of the circular outer boundary of the surrounding zone.

Figure 4:
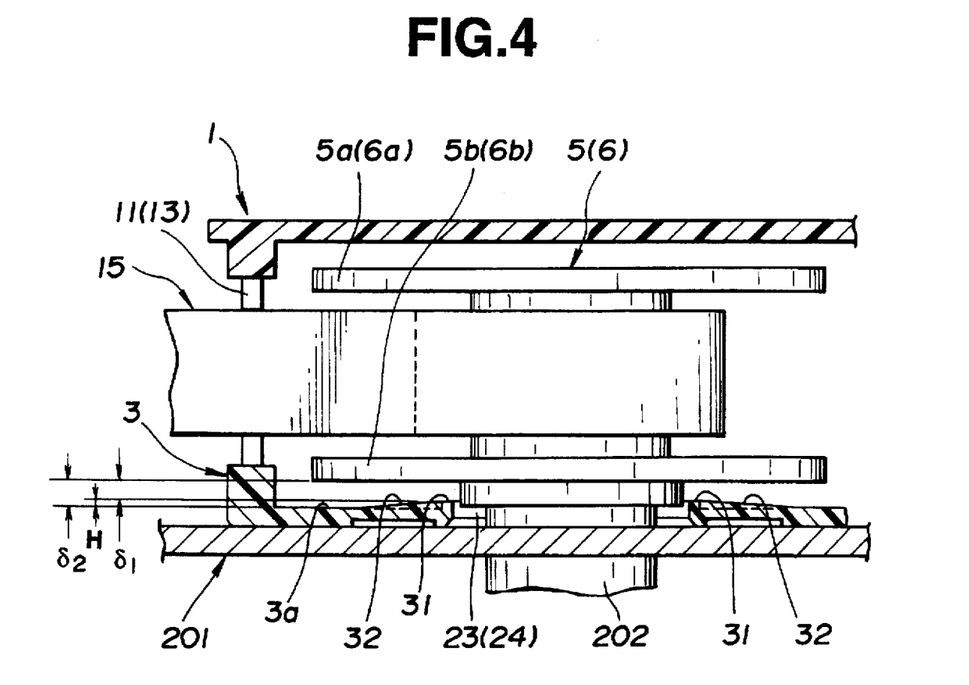
FIG. 4 is a sectional view showing a part of the tape cassette shown in FIGS. 1 and 2 in a loaded state in which a tape reel is supported by a reel holder of a drive system.

When the thus-constructed tape cassette 1 is loaded in the drive system, the first and second reel holders 202 of the drive system 201 protrude, respectively, into the first and second holder holes 23 and 24 of the tape cassette 1, as shown in FIG. 4, and lift up the first and second reels 5 and 6 slightly. In the state shown in FIG. 4, the lower flange 5b or 6b of each reel 5 or 6 is spaced upward from the top of the inner projection 31 by a predetermined spacing a 1. On each lateral side, the spacing of the lower flange 5b or 6b of the reel 5 or 6 from each radial outer projection 32 increases along the radial outward direction from δ1 at the radial inner end to δ2 at the radial outer end. The spacing δ2 at the radial outer end is equal to a sum of the spacing δ1 and the height H of the inner projection 31.

Figure 5:
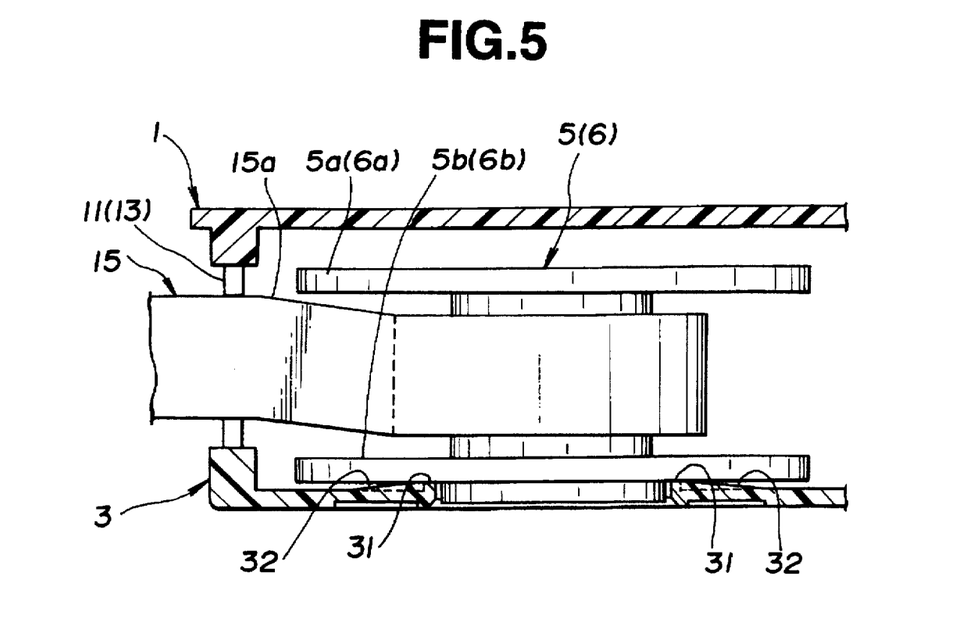
FIG. 5 is a sectional view showing the part of the tape cassette of FIG. 4 in an ejected state in which the tape reel is released from the support of the reel holder.

If either or both of the reels 5 and 6 vibrates during revolution, the axial runout of the rotating surface of the lower flange 5b or 6b becomes greater at the outer periphery of the lower flange 5b or 6b. In this case, the relatively broad spacing δ2 prevents the outer periphery of the flange 5b or 6b from touching the inside surface 3a of the lower half member 3. In the case of an ejecting operation, the relatively narrow spacing δ1 smaller than δ2 (δ1<δ2) makes small the amount of the downward movement of each tape reel 5 or 6. Therefore, as shown in FIG. 5, this cassette can prevent the upper reel flanges 5a and 6a from interfering with the upper edge 15a of the magnetic tape 15.

Figure 6:
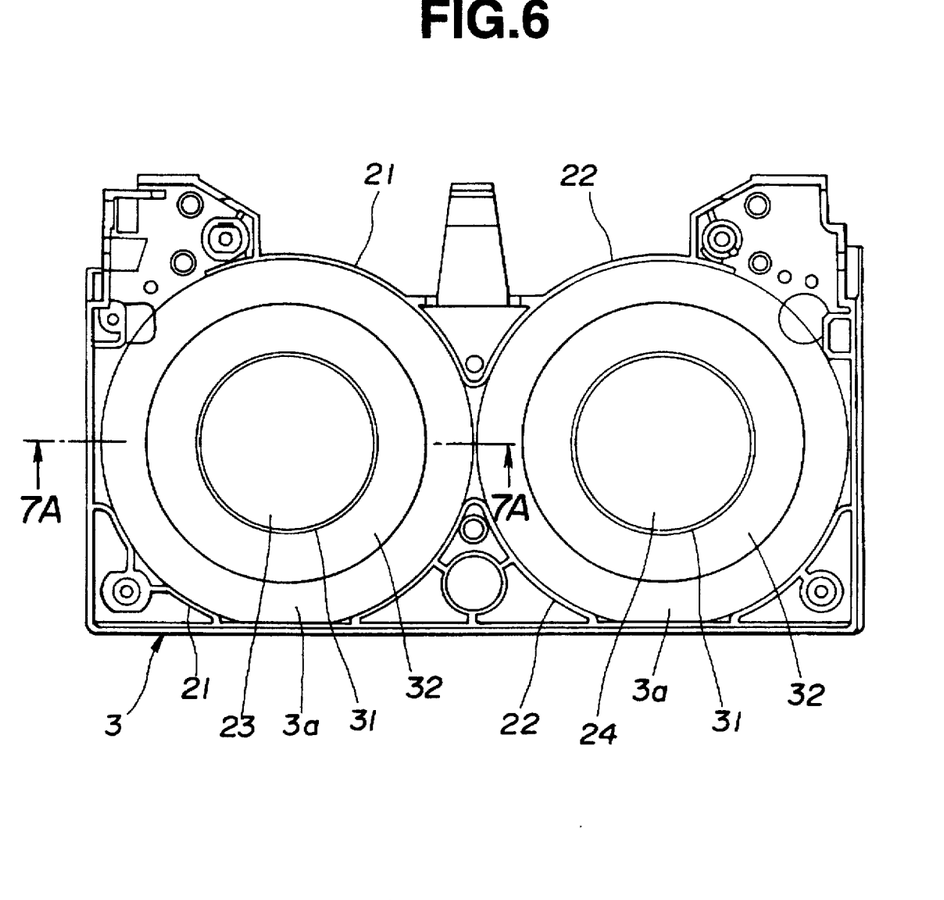
FIG. 6 is a plan view of a lower half case member according to the second embodiment of the present invention.
Figure 7:
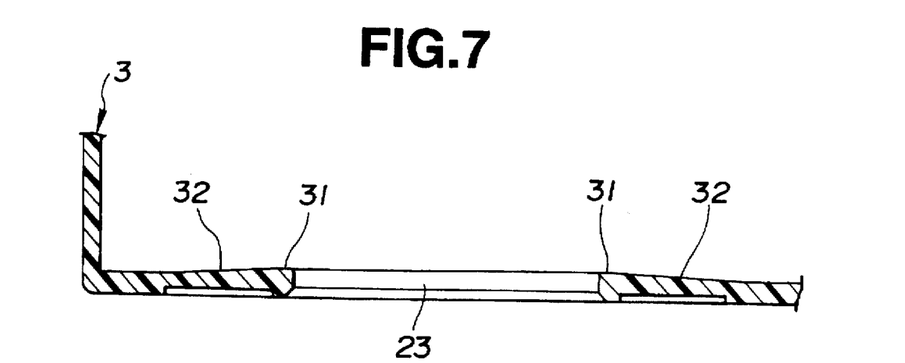
FIG. 7 is a sectional view taken across a line 7A—7A of FIG. 6.

FIGS. 6 and 7 show a tape cassette according to a second embodiment of the present invention. In this cassette, each of the first and second holder holes 23 and 24 is surrounded by a raised zone which consists of an annular inner portion 31, and an annular outer portion 32 surrounding the inner portion 31. The annular outer portion 32 has a conical surface similar to a curved surface of a frustum of a cone. The height of the outer portion 32 decreases gradually along the radial outward direction from the holder hole 23 or 24, and becomes equal to zero near the annular rib 21 or 22.

In the other respects, the cassette of the second embodiment is substantially identical to the cassette of the first embodiment.

Figure 8:
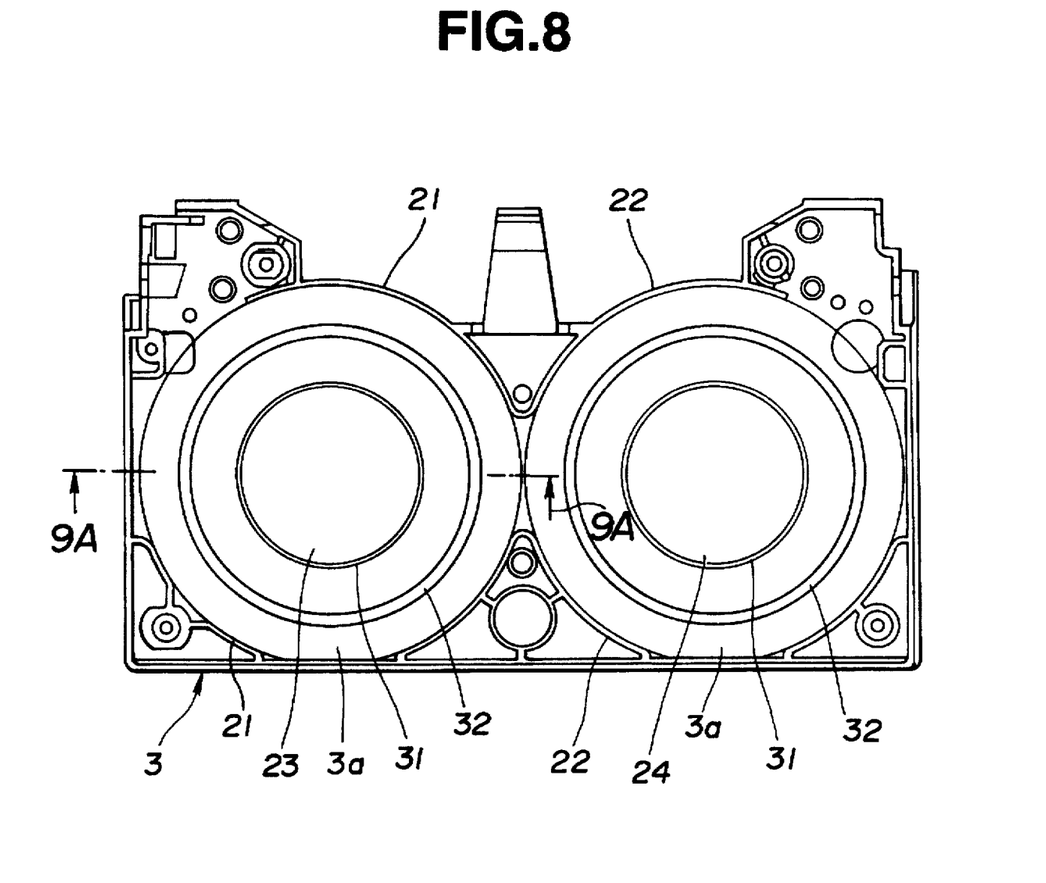
FIG. 8 is a plan view of a lower half case member according to the third embodiment of the present invention.
Figure 9:
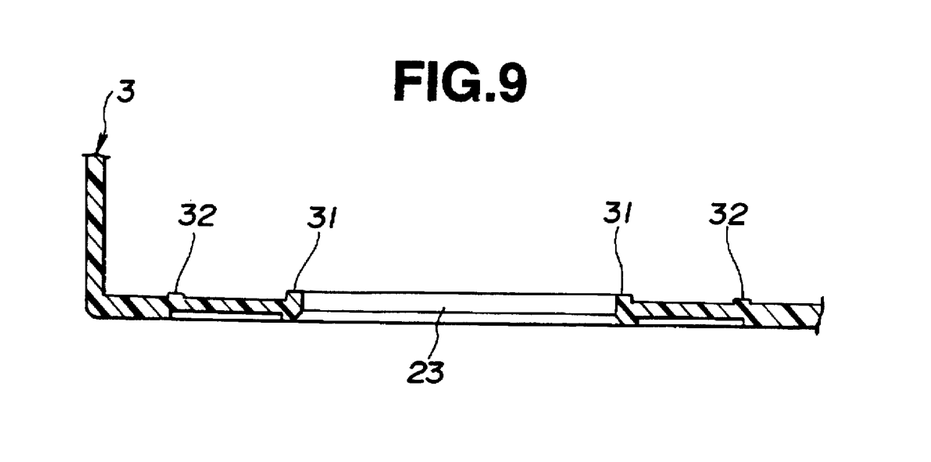
FIG. 9 is a sectional view taken across a line 9A—9A of FIG. 8.

FIGS. 8 and 9 show a tape cassette according to a third embodiment of the present invention. The lower half member 3 of this example has an annular inner projection 31 surrounding each of the holder holes 23 and 24, and an annular outer projection 32 surrounding the inner projection 31. In this example, the inner and outer projections 31 and 32 are both circular and concentric with each other. The outer projection 32 in this example is lower in height than the inner projection 31.

In the other respects, the cassette of the third embodiment is substatially identical to the cassette of the first embodiment.

The projections according to the present invention help increase the rigidity or mechanical strength of the lower half case member.

What is claimed is:

1. A tape cassette comprising:

tape carrying means having a tape reel with a tape wound thereon, and said tape reel having upper and lower flanges; and a cassette case enclosing said tape carrying means, said cassette case having an upper case member and a lower case member, said lower case member having a lower wall formed with a reel holder hole for receiving a reel holder of a cassette drive system to uphold said tape reel in said cassette case when said tape cassette is inserted in said cassette drive system;

wherein said lower case member further comprises a surrounding zone which surrounds said reel holder hole and which has an inner raised portion raised from an inside surface of said lower wall and arranged to face said lower flange of said tape reel, and an outer raised portion raised from said inside surface of said lower wall and arranged to face said lower flange of said tape reel, said inner raised portion being closer to said reel holder hole than said outer raised portion, and a height of said inner raised portion is greater than a height of said outer raised portion, wherein said lower flange rests on at least said inner wall portion when said reel holder is not received in said lower case member.

2. A tape cassette as claimed in claim 1 wherein said inner raised portion of said surrounding zone is annular and encircles said holder hole.

3. A tape cassette as claimed in claim 2 wherein said outer raised portion of said surrounding zone comprises a sloping surface extending from a radial inner slope end to a radial outer slope end extending radially outwardly from said reel holder hole, and a height of said sloping surface from said inside surface of said lower wall of said lower case member becomes gradually smaller from said radial inner slope end to said radial outer slope end.

4. A tape cassette as claimed in claim 3 wherein said outer raised portion of said surrounding zone comprises a plurality of radial ridges radiating from said inner raised portion, each of said radial ridges comprises said sloping surface.

5. A tape cassette as claimed in claim 3 wherein said sloping surface of said outer raised portion is a conical surface surrounding said inner raised portion.

6. A tape cassette as claimed in claim 3, wherein said surrounding zone is bounded by a circular outer boundary, said height of said sloping surface becomes equal to zero at said outer boundary, and said lower flange having a diameter greater than a diameter of said circular outer boundary.

7. A tape cassette as claimed in claim 2 wherein said outer raised portion is annular and encircles said inner raised portion.

8. A tape cassette as claimed in claim 7 wherein an outside diameter of said outer raised portion is smaller than a diameter of said lower flange of said tape reel.

* * * * *